US010533899B2

(12) United States Patent
Rudkin

(10) Patent No.: US 10,533,899 B2
(45) Date of Patent: Jan. 14, 2020

(54) COOLED THERMOCOUPLE

(71) Applicant: Weston Aerospace Limited, Farnborough, Hampshire (GB)

(72) Inventor: Mark Rudkin, Farnborough (GB)

(73) Assignee: WESTON AEROSPACE LIMITED, Hampshire (GB)

(*) Notice: Subject to any disclaimer, the term of this patent is extended or adjusted under 35 U.S.C. 154(b) by 302 days.

(21) Appl. No.: 15/219,818

(22) Filed: Jul. 26, 2016

(65) Prior Publication Data
US 2017/0030779 A1   Feb. 2, 2017

(30) Foreign Application Priority Data
Jul. 27, 2015   (GB) .................................. 1513164.2

(51) Int. Cl.
*G01K 7/00* (2006.01)
*G01K 7/12* (2006.01)
*G01K 1/12* (2006.01)

(52) U.S. Cl.
CPC ................. *G01K 7/12* (2013.01); *G01K 1/12* (2013.01)

(58) Field of Classification Search
CPC combination set(s) only.
See application file for complete search history.

(56) References Cited

U.S. PATENT DOCUMENTS

| 3,301,715 A | 1/1967 | Gerrard et al. |
| 3,451,268 A | 6/1969 | Meador |
| 3,769,792 A | 11/1973 | Grey |
| 3,862,574 A | 1/1975 | Antoine et al. |
| 3,923,552 A * | 12/1975 | Parris .................. G01K 1/08 136/227 |
| 5,228,114 A * | 7/1993 | Suzuki .............. H01L 21/67248 118/712 |

(Continued)

FOREIGN PATENT DOCUMENTS

| EP | 989393 A2 | 3/2000 |
| EP | 1014059 B1 | 10/2005 |

(Continued)

OTHER PUBLICATIONS

European Patent Application No. 16181063.5, Extended European Search Report dated Dec. 8, 2016, 5 pages.

(Continued)

*Primary Examiner* — Lisa M Caputo
*Assistant Examiner* — Nasir U. Ahmed
(74) *Attorney, Agent, or Firm* — Fredrikson & Byron, P.A.

(57) ABSTRACT

The present invention provides a thermocouple probe (10). The probe includes a first pair of thermocouple wires (50) joined to form a first thermocouple junction (56) at a sensing tip (14) of the thermocouple probe and a cooling arrangement (20) defining a cooling pathway (34) adjacent to a cooled portion of the probe. The sensing tip projects beyond the cooling arrangement and is cooled during use by conduction to the cooled portion of the probe. The probe further includes a second pair of thermocouple wires (54) joined to form a second thermocouple junction (52) in the cooled portion of the probe and adjacent to the sensing tip. The present invention also provides a method and a system for determining the gas temperature (Tg) in a high temperature environment, such as a jet engine.

17 Claims, 5 Drawing Sheets

(56) References Cited

U.S. PATENT DOCUMENTS

| | | | |
|---|---|---|---|
| 5,312,186 A | 5/1994 | Swan | |
| 5,863,123 A * | 1/1999 | Lee | G01K 7/04 |
| | | | 136/230 |
| 9,956,032 B1 * | 5/2018 | Cosman | A61B 18/1477 |
| 2009/0041084 A1 | 2/2009 | Sakami et al. | |
| 2014/0376593 A1 * | 12/2014 | Ewing | G01K 7/02 |
| | | | 374/179 |
| 2015/0260612 A1 * | 9/2015 | DeSilva | G01M 15/14 |
| | | | 702/48 |

FOREIGN PATENT DOCUMENTS

| | | |
|---|---|---|
| EP | 2610599 A2 | 7/2013 |
| GB | 1388816 A | 3/1975 |
| GB | 2100003 B | 2/1985 |
| GB | 2406967 B | 11/2006 |
| GB | 2515483 A | 12/2014 |

OTHER PUBLICATIONS

GB Patent Application No. 1513164.2, Search Report dated Jan. 19, 2016, 4 pages.

* cited by examiner

DETAIL A

DETAIL B

COOLED THERMOCOUPLE

The present invention is concerned with a cooling arrangement for a thermocouple. Embodiments of the invention are particularly useful in conjunction with thermocouples used to sense the temperature of high temperature gases such as, for example, the gases in an engine (for example in a jet engine).

Thermocouples of the type described in EP0989393, EP1014059 and/or GB 2,406,967 are used to sense the temperature in a jet turbine. The temperature inside a turbine is measured as knowing the temperature allows one to improve or optimise control of the engine. Turbine temperature is an important parameter for any engine performance optimisation system. The temperature inside the turbine is also monitored to make sure it does not reach the engine's so-called redline temperature at which components or materials might fail. The redline temperature is the maximum safe running temperature or associated speed.

The temperatures inside the turbine stage of a jet engine are typically in excess of 1000° C. The continuous flow of gas to which a turbine is exposed can be at a temperature between 850° C. to 1700° C. This may be above the melting point of the materials used to make for example, the turbine blades so it is necessary to cool the blades. Turbine blades are typically cooled by creating a cooling boundary layer between the turbine surface and the hot gases. As described in EP 2 568 115 this may be done by providing hollow turbine blades with bleed holes around the blade leading edge, and feeding air from the compressor through the blade and onto the blade surface to create a cooling boundary layer between the blade surface and the hot gases.

The thermocouples used to monitor the temperature of the gases inside the turbine need to be able to cope with the very hot temperatures. High temperature thermocouples are typically platinum/rhodium thermocouples. Although they can operate at temperatures of up to about 1600° C., they are more expensive than, for example, K-type thermocouples. Furthermore, there is a drive to increase the operating temperature of jet engines as increasing the temperature increases fuel efficiency, boosts thrust and reduces emissions. As engine temperatures increase, there is an increasing need for thermocouples which can operate at temperatures higher than those defined by current material limits.

In parallel with the drive for the increased engine temperatures associated with lean burn engines, placing the turbine temperature sensing thermocouple closer to the combustor may improve the temperature measurement but also means that the thermocouple is in a hotter location and must therefore withstand higher temperatures.

There is therefore a need for a system for cooling thermocouples used to sense the temperature of high temperature gases.

The present invention provides a thermocouple probe comprising a first pair of thermocouple wires joined to form a first thermocouple junction at a sensing tip of the thermocouple probe and a cooling arrangement defining a cooling pathway adjacent to a cooled portion of the probe, the sensing tip projecting beyond the cooling arrangement and cooled during use by conduction to the cooled portion of the probe, and wherein the probe further comprises a second pair of thermocouple wires joined to form a second thermocouple junction in the cooled portion of the probe and adjacent to the sensing tip. The inventors have appreciated that embodiments of this arrangement allow for accurate sensing of gas temperature in a high temperature and hostile environment whilst allowing one to use cheaper thermocouples normally not suitable for high temperature and hostile environments.

Preferably the thermocouple probe is used for monitoring the temperature in a jet engine. As discussed above, there is a move towards higher jet engine temperatures to increase operating efficiency. Historically the temperature in jet engines has been sensed with K type thermocouples as these have been adequate for the historical operating temperatures. However, as temperatures increase K-type thermocouples become unreliable. A solution would be to simply replace the K-type thermocouples with thermocouples such as platinum-rhodium thermocouples which can operate at higher temperatures. However, thermocouples and other system elements used in aerospace applications must go through stringent qualifying tests (by the thermocouple manufacturer, the engine manufacturer and then the relevant aviation authority) of the thermocouple itself, its associated new electronics and the associated software, before they can be used. The cost of replacing the already tested and accepted K-type with an alternative high temperature thermocouple, such as a platinum-rhodium thermocouple, must therefore include both the cost of the more expensive thermocouple and the cost (and delay) associated with the necessary qualifying tests. The subject invention allows one to measure higher temperatures with the known and already tested thermocouples.

In certain preferred embodiments, the probe further comprises connectors for connecting the first and second pairs of thermocouple wires to a correction data processor whereby the data processor can correct the temperature sensed by the probe to take account of the effect of the cooling arrangement. Alternatively, the first and second pairs of thermocouple wires may be extended from the probe to a remote location at which the connectors are positioned for connecting the first and second pairs of thermocouple wires to a correction data processor.

Preferably the thermocouple probe arrangement includes a probe head portion for mounting onto the casing of a gas turbine such as a jet engine, and wherein the connectors are part of the probe head portion and are to connect the probe to a data processor outside the gas turbine.

The cooling arrangement may be an open loop circuit. Alternatively, the cooling arrangement is a closed loop circuit. The cooling arrangement may use air from a cooler part of the engine to draw heat away from the cooled portion of the probe by directing the air along the cooling pathway, The cooling arrangement may use air from a cooler part of the engine to draw heat away from a coolant used in the cooling arrangement. In certain embodiments, the cooling arrangement is the evaporator stage of a phase-change refrigeration system. This is a particularly efficient cooling arrangement.

Preferably, the first and second pairs of thermocouple wires are supported inside a sheath or casing. Preferably the sheath or casing comprises a mineral insulated cable. The first and second pairs of thermocouple wires may each be supported inside a separate sheath or casing. Preferably, the first and second pairs of thermocouple wires are both supported inside the same sheath or casing. This allows a more accurate calculation of the heat drawn away from the sensor tip and thus a more accurate determination of the actual gas temperature.

The cooling arrangement may comprise any suitable cooling arrangement, such as an arrangement that provides a cooling boundary layer between the thermocouple surface and the hot gases flowing over. Where the first and second pairs of thermocouple wires are supported inside a sheath or casing, the cooling arrangement may comprise one or more microbore tubes running through the sheath or casing and around the second pair of thermocouple wires. Preferably, the cooling arrangement comprises a cooling jacket around the sheath or casing, and wherein the sensing tip of the thermocouple probe projects beyond the cooling jacket.

The cooling jacket may comprise any suitable number of tubes positioned around one or more portions of the thermocouple. For example, where the cooling arrangement is an open loop circuit, the cooling jacket may comprise a single tube around a portion of the thermocouple, the tube having an outlet towards its distal end from which a coolant fluid, such as air, is aspirated. Alternatively, the cooling jacket may include a pair of concentric tubes defining a return coolant circuit from the end of the probe proximal the connectors, to a portion of the probe distal from the connectors, and then back to the proximal end of the probe. This is simple and effective cooling construction.

The invention also provides, in a second aspect, a method for determining the gas temperature (Tg) in a high temperature environment such as a jet engine, the method comprising: providing a thermocouple probe with a first thermocouple junction at a sensing end of the probe to obtain a first temperature measurement (T1) inside the high temperature environment; cooling at least a portion of the thermocouple probe inside the jet engine by passing a coolant through a coolant pathway adjacent to a cooled portion of the probe, the sensing end of the probe projecting beyond the coolant pathway and cooled by conduction to the cooled portion of the probe; providing the thermocouple probe with a second thermocouple junction adjacent to the sensing end and adjacent to the coolant pathway to obtain a second temperature measurement (T2) in the cooled portion of the probe; determining a compensation factor for the first temperature measurement (T1) from the second temperature measurement (T2) to compensate for the effect of the coolant, by determining flow rate and pressure values for a gas stream in the high temperature environment; and calculating the gas temperature in the high temperature environment (Tg) by applying the compensation factor to the first temperature measurement (T1). The inventors have appreciated that embodiments of such a method may make for accurate sensing of gas temperature in a high temperature and hostile environment whilst allowing one to use cheaper thermocouples normally not suitable for high temperature and hostile environments.

Preferably the step of determining the compensation factor includes determining flow rate and pressure values for a gas stream in the high temperature environment and comparing the first and second temperatures to an empirically determined look-up table generated by testing the probe in different flow rate and pressure conditions. Creating an accurate theoretical model of the behaviour of the thermocouple system can be complicated and require significant processing. The inventors have appreciated that it may be advantageous and allow for reduced or simpler processing to empirically determine the relationship between the first and second temperatures measured by the first and second thermocouple junctions of the probe and the flow rate and pressure of the gas stream on a test rig and use those empirically determined values to populate a multi-dimensional look-up table.

Preferably wherein the step of calculating the gas temperature of the high temperature environment (Tg) includes using the function:

$$Tg=T1+G(p,v)(T1-T2)$$

where $G(p,v)$ is an empirically determined function that is dependent on the pressure (p) and flow rate (v) of a gas stream in which probe is located. The inventors have appreciated that it is possible to create a theoretical model of the system which can be used on its own or together with empirically determined system values to either populate a look-up table for subsequent live use, or to determine a compensation factor live as system parameters are sensed and determined.

Preferably, the high temperature environment is the turbine stage in a jet engine and the pressure and flow rate values for the gas stream are derived from pressure and turbine rotational speed measurements taken in the jet engine. These measurements may be obtained by existing sensors within the engine.

Preferred embodiments of the invention will now be described by way of non-limiting example, with reference to the attached figures in which.

Figure 1:
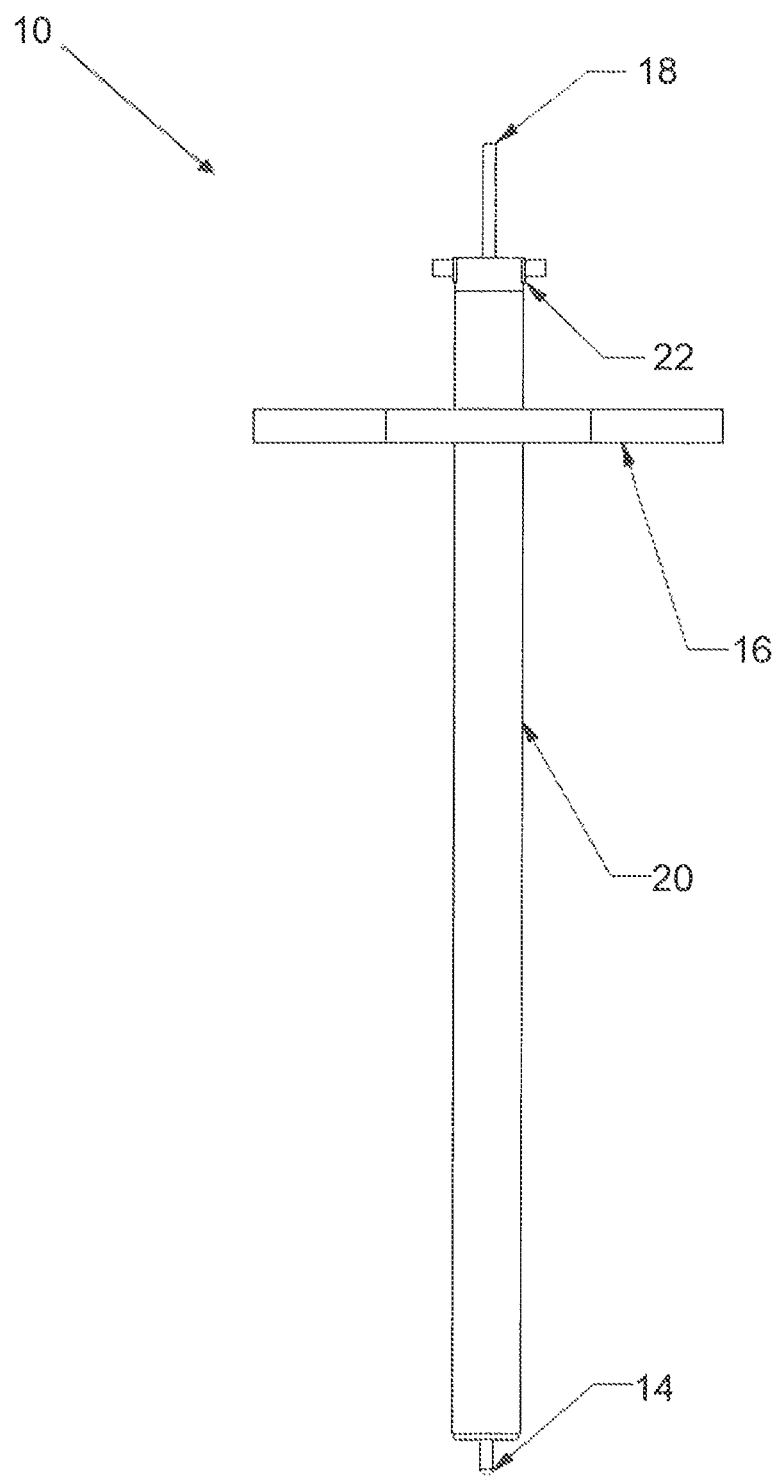
FIG. 1 illustrates a thermocouple sensor probe according to the present invention.
Figure 2:
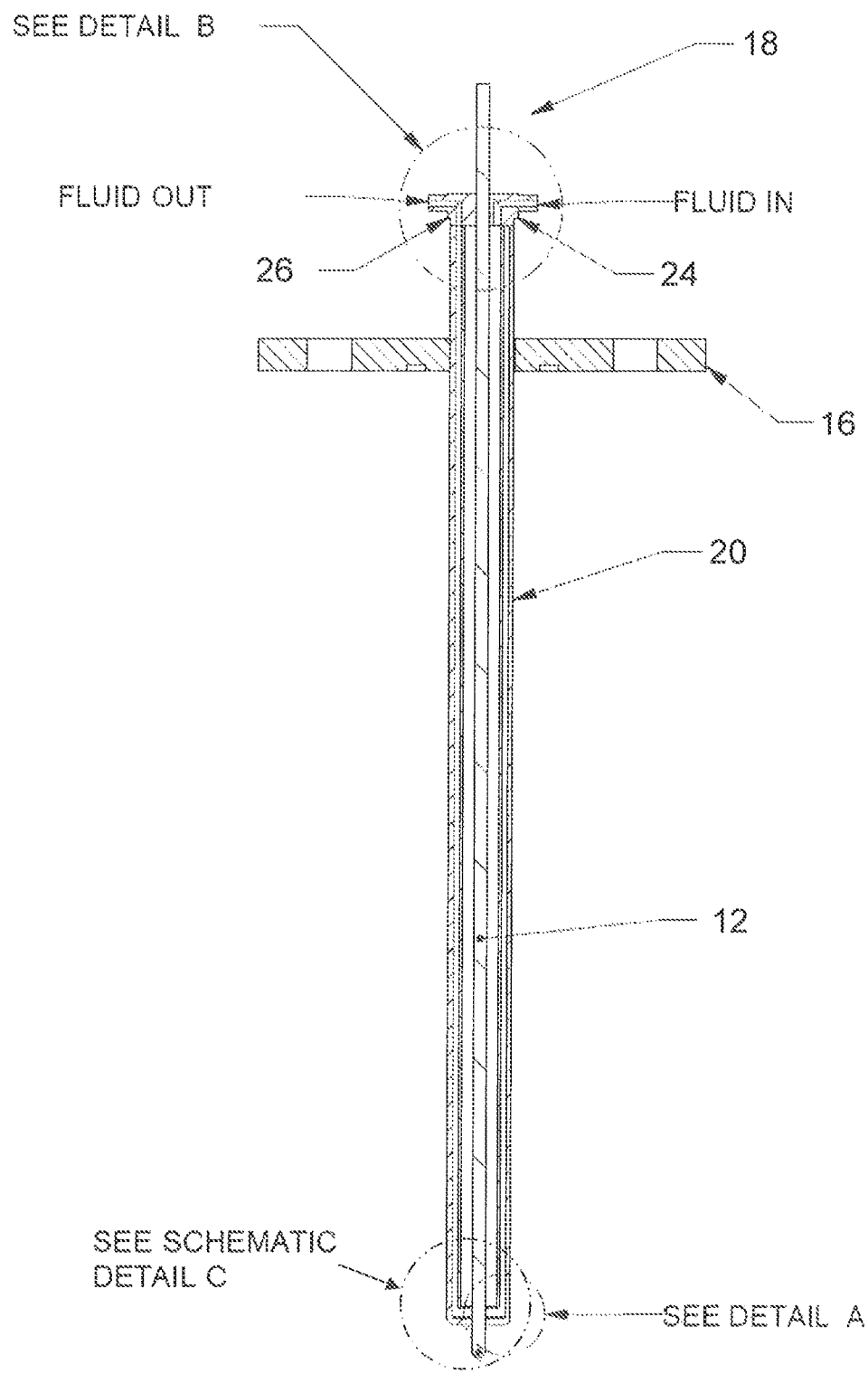
FIG. 2 is a cross-sectional view through the probe of FIG. 1.

Referring to FIGS. 1 and 2, a thermocouple sensor probe 10 is shown. The probe 10 includes a thermocouple 12 with a temperature sensing tip 14 at its distal end. The thermocouple 12 may be, for example, one of the 684 range of thermocouples available from Weston Aerospace limited and used in Rolls-Royce Trent engines. The probe 10 has a mounting flange 16 for mounting to a portion of an engine casing (not shown) and surrounding a hole in the engine casing so that, in use, the distal temperature sensing tip 14 of the thermocouple 12 extends into the engine. A sensor head located outside the engine has sensor terminals (not shown) for connection of the proximal end 18 of the probe to sensing circuitry and/or data processing arrangements.

A cooling jacket 20 is provided around the thermocouple 12 (see for example, GB 2,406,967) and a coolant connector head 22 is provided to connect the cooling jacket 20 to a supply of coolant via a coolant inlet 24 and a coolant outlet 26, thus forming a cooling circuit. The cooling circuit may be the evaporator stage of a phase-change refrigeration system. The cooling jacket 20 could be made of a nickel based material, optimised for thermal conduction. The cooling jacket material preferably is of a similar material to the thermocouple 12. A nickel based cooling jacket is therefore suitable for a K type thermocouple such as those used in the Weston Aerospace 684 range of thermocouples. K type thermocouples have one wire of chromel (90% nickel and 10% chromium) and the other of alumel (95% nickel, 2% manganese, 2% aluminium and 1% silicon). The coolant may be air, another gas or liquid, and/or a combination of these. The coolant would have to cope with extreme temperatures (which can reach 1700° C. in a jet engine) to which the cooling system is subjected, and not corrode the materials (nickel in the embodiments described in this application) used in the cooling circuit construction. The skilled man can readily identify a suitable coolant appropriate for the working conditions.

Figure 3:
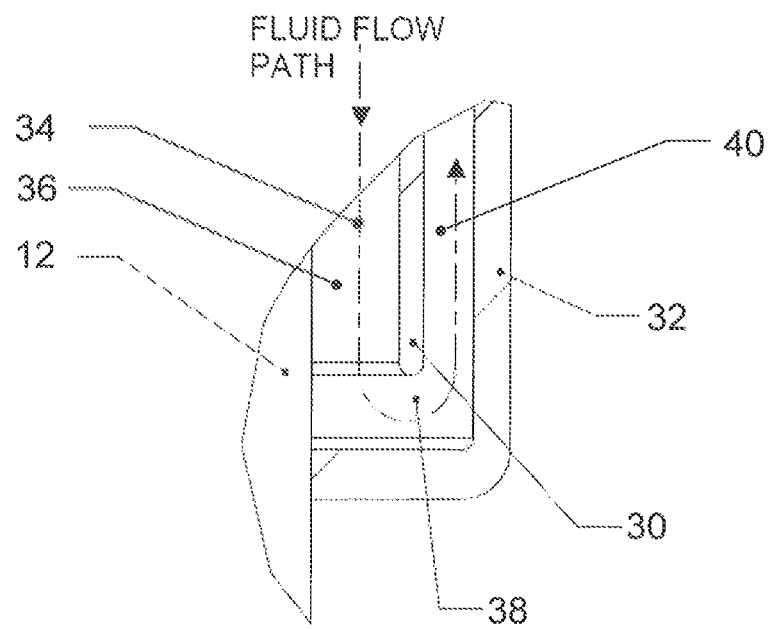
FIGS. 3, 4 and 5 are, respectively, views of details A, B and C of FIG. 2.
Figure 4:
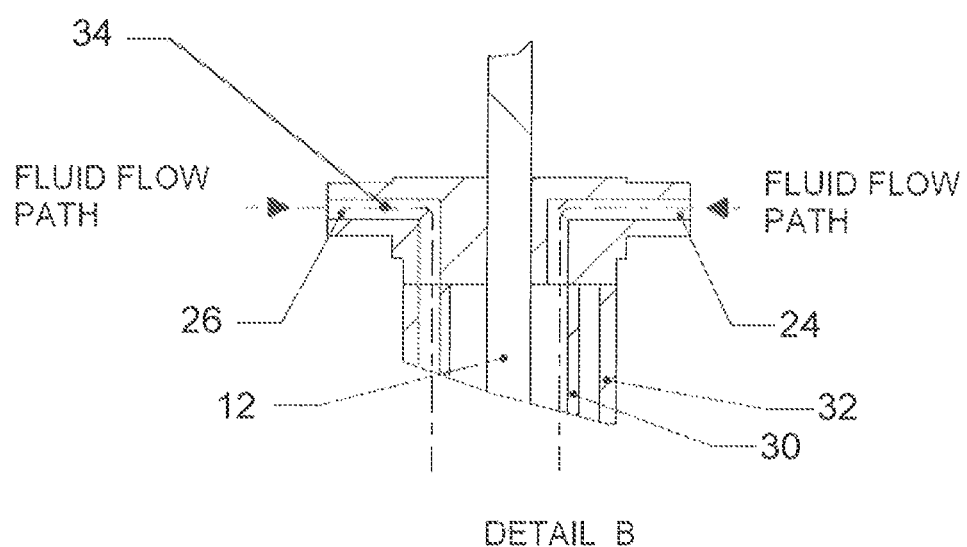

Referring to FIGS. 3 and 4, the cooling jacket 20 defines an intermediate tube 30 immediately adjacent to and around the thermocouple 12 and an outer casing or outer tube 32 surrounding the intermediate tube 30 and connected thereto at the proximal end 18 of the probe 10. The temperature sensing end 14 of the thermocouple 12 projects from the cooling jacket 20. The intermediate tube 30 and outer tube 32 define a coolant pathway 34 running from the coolant inlet 24 to the coolant outlet 26. The coolant pathway 34 runs through an inner coolant passage 36 between the outer surface of the thermocouple 12 and the intermediate tube 30, through a distal connecting passage 38 (see FIG. 3) into an outer coolant passage 40 between the outside of the intermediate tube 30 and outer tube 32, and thence to the coolant outlet 26.

Figure 5:
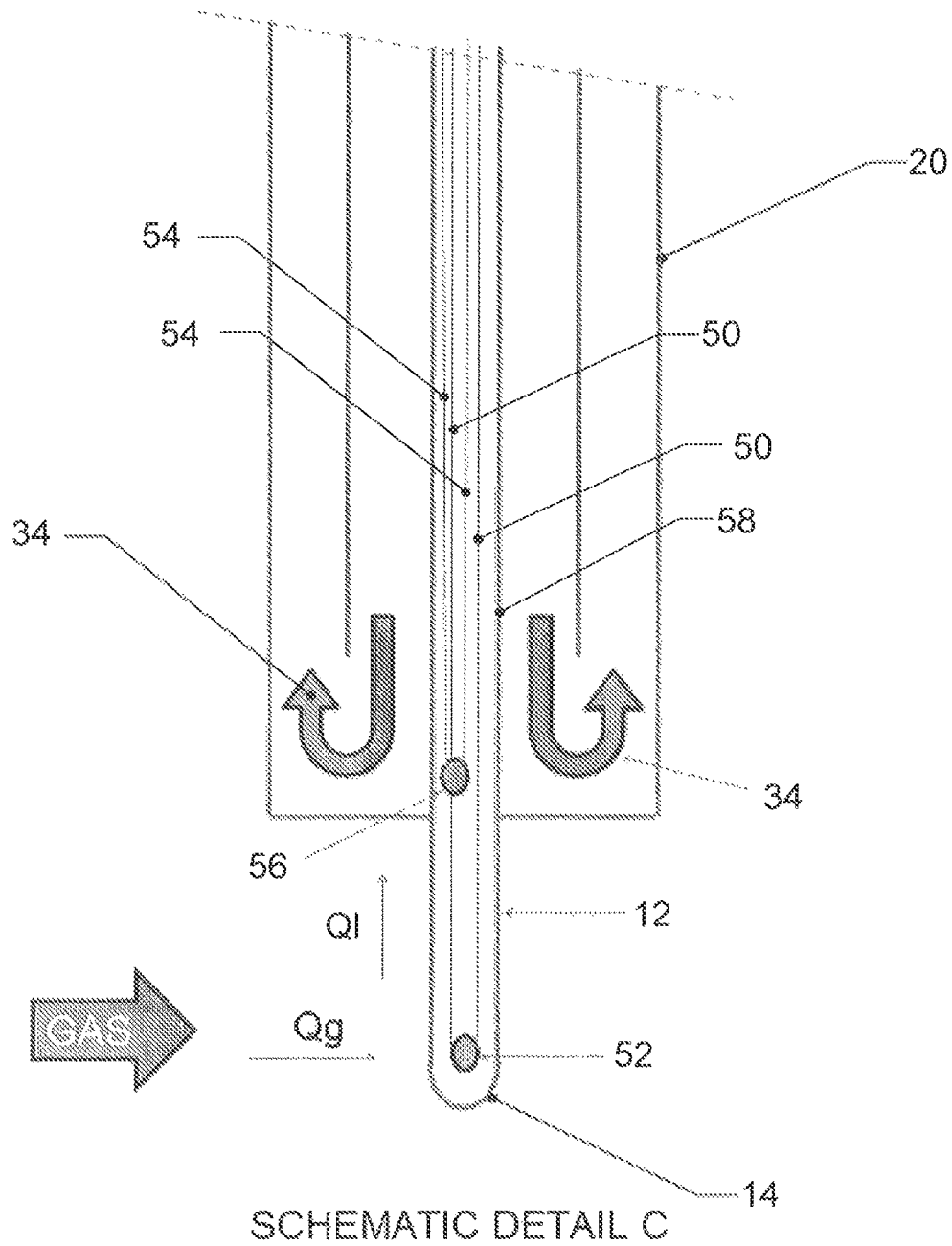

Referring to FIG. 5, the thermocouple 12 includes a first pair of dissimilar thermocouple wires 50 connected at their distal ends to form a first thermocouple junction 52 at the sensing tip 14 of the probe 10. The first thermocouple junction 52 is at the sensing tip 14, that is, in a portion of the thermocouple 12 that projects from and extends beyond the cooling jacket 20. The first pair of wires 50 are connected at their proximal ends to sensor terminals (not shown) and thence to sensing circuitry in the known manner described in, for example EP 1 014 059. The thermocouple 12 also includes a second pair of thermocouple wires 54 connected at their distal ends to form a second thermocouple junction 56. The second thermocouple junction 56 is in thermal communication with the coolant pathway 34 and is located at the distal end of the cooling jacket 20, adjacent to the tip 14 but within the cooling jacket 20. The first and second pairs of wires 50, 54 are held inside a mineral insulated (MI) sheath 58. The cavities inside the sheath 58 and around the wires 50, 54 are filled with an insulant.

In use, heat is conducted from the tip or temperature sensing end 14 of the probe 10 and coolant jacket 20 towards the mounting flange 16. Coolant flows along the coolant pathway 34 from the coolant inlet 24 towards the tip 14 along the inner coolant passage 36, out of the distal end of the intermediate tube 30 then towards the coolant outlet 26 along the outer coolant passage 38, collecting heat on the way. The stem of the thermocouple 12 is cooler as a result of the coolant flow and more heat can therefore also be removed from the sensing tip 14 by conduction through the cooler stem such that the tip 14 can survive in a hotter environment than would be the case without the cooled stem.

The heat energy collected by the coolant as it passes through the cooling circuit would have to be dumped after exiting the outlet 26 and before it returns to the coolant inlet 24 (in a closed loop cooling circuit). In such an example, the heat would be dumped into a cooler zone via a heat exchanger (not shown) before the coolant returns to the coolant inlet 24. In alternative embodiments (not shown), the cooling circuit could be an open loop cooling circuit, in which case the coolant outlet could still be positioned in the probe head, or could be located at any suitable position along the length of the coolant jacket. For example, the coolant outlet could be towards the sensing end of the probe and coolant vented in the hot zone, that is, inside the engine.

The effect of the flowing coolant will significantly affect the temperature of the sensing tip 14 and thus the temperature sensed by the first pair of wires 50 at the first thermocouple junction 52. In order to accurately determine the temperature of the gas stream in which the tip is placed, it is therefore necessary to compensate or adjust for the cooling effect produced by the flow of coolant through the cooling circuit defined by the intermediate tube and outer cooling jacket, as discussed below.

The magnitude or value of the cooling effect can be determined from the temperature gradient in the probe between the first thermocouple junction 52 and the second thermocouple junction 56. The heat loss (Ql) from the probe tip 14 due to the cooling effect can then be used to correct the temperature sensed by the sensing tip (i.e. measured temperature) to determine the gas temperature (i.e. actual temperature), as discussed below in relation to FIG. 6. Other engine parameters and variables may also have an effect on the magnitude of the cooling effect and can be used to further correct or compensate for the effect of the coolant flow. These include: turbine rotor speed; pressure of gas in the turbine; and mass flow rate or velocity through the turbine of the turbine gas. Some of these parameters and variables, such as mass flow rate or velocity of gas through the turbine, may be derived from other measured variables, such as turbine rotational speed and gas pressure, rather than being measured directly.

Figure 6:
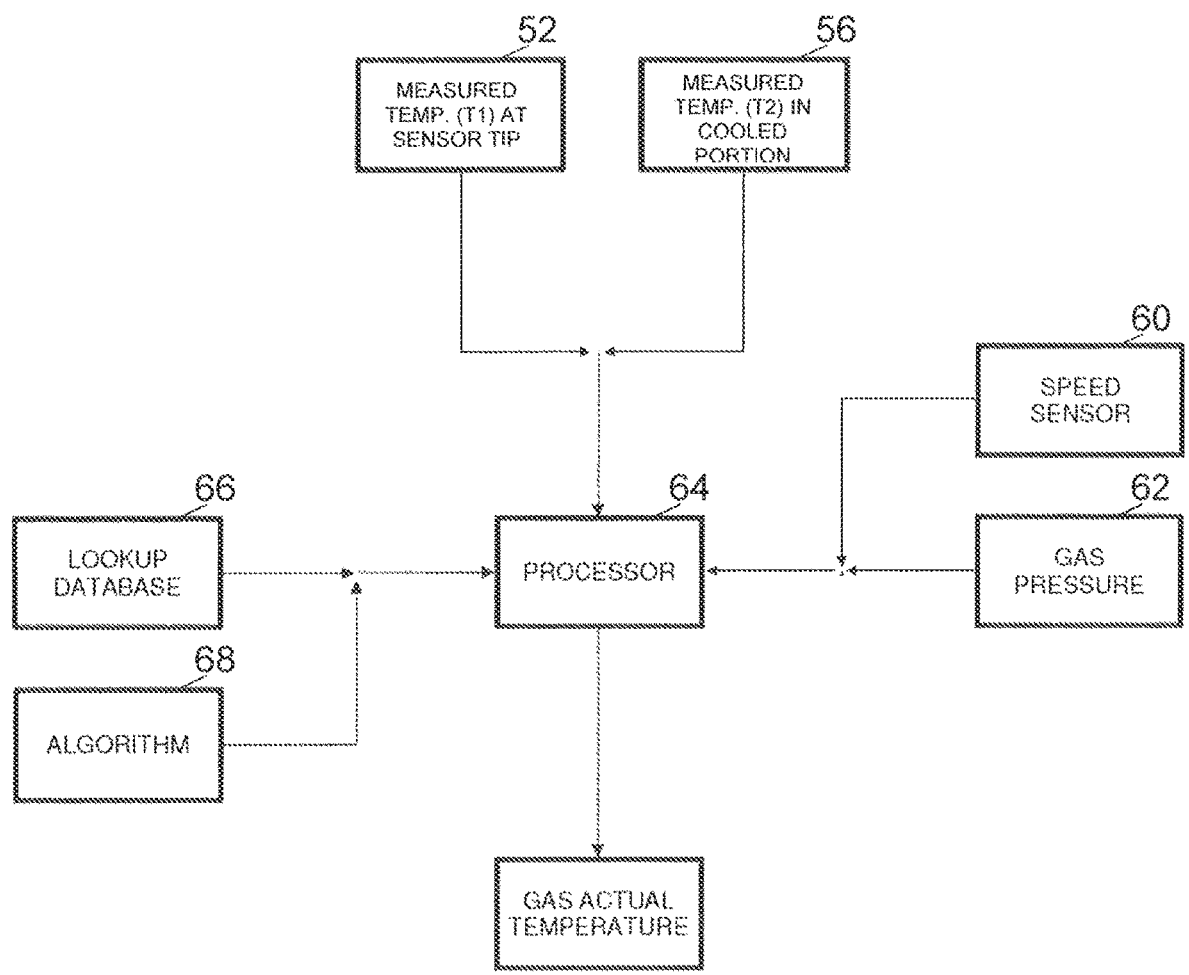
FIG. 6 is a schematic flow diagram illustrating a preferred method of operating the probe according to the present invention.

Referring to FIG. 6, the system includes:
a) the first thermocouple junction 52 to determine the measured gas temperature (T1) at the sensing tip 14;
b) the second thermocouple junction 56 to determine the temperature (T2) of a cooled portion of the thermocouple 12 adjacent to the sensing tip 14;
c) a turbine speed sensor 60;
d) a gas pressure sensor 62;
e) a data processor 64.

The value determined by the thermocouple junctions 52, 56 and turbine sensors 60, 62, are fed into the data processor 64. The data processor 64 uses these values along with a multi-dimensional look-up table 66 and/or algorithm 68 to produce a corrected value for the actual gas temperature (Tg) that takes into account the heat loss from the probe tip (Ql) and the heat gained by the probe tip from the gas stream (Qg), as discussed below:

The heat loss from the probe tip (Ql) is given by:

$$Q_l = (T_1 - T_2)K$$

Where T1 is the temperature measured by the first thermocouple junction, T2 is the temperature measured by the second thermocouple junction, and K is the effective thermal conductance between the first and second thermocouple junctions.

The heat gained by the probe tip from the gas stream (Qg) is given by:

$$Q_g = (T_g - T_1) \cdot f(p,v)$$

Where Tg is the temperature of the gas stream and f(p,v) is an empirically determined heat exchange conductance (W/° C.) that is dependent on the gas stream pressure p and flow rate v. Gas stream pressure p and flow rate v can be derived from gas pressure and turbine rotation speed measurements made in the engine using existing sensors.

In the steady state, the heat gained and the heat lost by the tip are equal. In other words, Ql=Qg. The above equations for Ql and Qg can then be rearranged to determine the actual gas temperature Tg, as follows:

$$(T_1 - T_2)K = (T_g - T_1) \cdot f(p, v)$$

$$T_g = T_1 + K \frac{(T_1 - T_2)}{f(p, v)}$$

This can be simplified by defining a new function G(p,v) which is equal to K/f(p,v):

$$T_g = T_1 + G(p,v)(T_1 - T_2)$$

Function G(p,v) can be determined empirically by testing the probe in different flow and pressure conditions to generate an equation or look-up table.

The actual temperature of the gas flowing through the turbine can then be determined from the measured temperatures T1 and T2. Alternatively to the above algorithm, it is possible to carry out calibration measurements using the cooled thermocouple in a gas whose temperature, density, flow rate and pressure is known or measured by an alternative method to thereby empirically create a multi-dimensional look-up table which relates measured gas temperature (T1) to actual gas temperature (Tg) for different values of T2 sensed in the thermocouple system and turbine.

The embodiment described above with reference to FIGS. 1 to 6 cools the probe using a cooling jacket around the sensor probe stem. In an alternative embodiment (not shown), the two thermocouple wires are supported inside a sheath and the cooling arrangement comprises a microbore tube or pipe which runs inside the thermocouple sheath and around the thermocouple wires so that coolant flows around the second pair of thermocouple wires and draws heat from the sensing tip. The thermocouple may be of similar construction to the thermocouple 12 described above in connection with FIGS. 1 to 6. For example, the thermocouple may be from the 684 range of Weston Aerospace thermocouples in which the two pairs of thermocouple wires are inside a mineral insulated (MI) sheath and the cavity inside the sheath and around the thermocouple wires is filed with an insulant. The coolant tube does not completely surround the thermocouple. It could be twisted around the tube in an alternative embodiment so that it surrounds a larger portion of the thermocouple wires.

While the embodiments described above describe closed loop cooling systems, alternative embodiments could use one or more open loop cooling circuits. If an open loop cooling circuit is used, the coolant outlet could be in the hot zone (inside the engine), rather than in the head end of the probe, as described above. In such embodiments, where the cooling arrangement includes a cooling jacket, the outlet could be a hole in the cooling jacket that vents bleed air or liquid. Further additional or alternative cooling methodologies include, but are not limited to, a cooling boundary layer between the thermocouple surface and the hot gases flowing over it. This could be done via bleed holes in the outer surface of an external cooling jacket placed around the thermocouple probe where cooler bleed air is injected into the aspirated cooling jacket aspirated into the main gas flow to provide cooling.

The invention claimed is:

1. A thermocouple probe including a proximal probe connection end for connection to a data processor and a distal probe sensing end for sensing temperature, the thermocouple probe comprising:
    a thermocouple sheath housing a first pair of thermocouple wires each having proximal and distal ends, the distal ends of the first pair of wires being joined to form a first temperature sensing thermocouple junction at the distal probe sensing end, the sheath also housing a second pair of thermocouple wires each having proximal and distal ends, the distal ends of the second pair of wires being joined to form a second compensating thermocouple junction at a compensating thermocouple location separated from the distal probe sensing end; and
    a cooling arrangement comprising a cooling tube defining a cooling pathway for fluid coolant adjacent a portion of the pairs of thermocouple wires, wherein the cooling tube extends over the compensating thermocouple location yet stops short of extending over the distal probe sensing end.

2. The thermocouple probe according to claim 1, wherein the probe further comprises connectors for connecting the first and second pairs of thermocouple wires to the data processor.

3. The thermocouple probe according to claim 2, wherein the data processor is a correction data processor for correcting the temperature sensed by the probe to take account of effect of the cooling arrangement.

4. The thermocouple probe according to claim 2, wherein the proximal probe connection end further comprises a probe head portion for mounting onto a casing of a gas turbine, wherein the connectors are part of the probe head portion and connect the probe to the data processor and remote from an area at which the temperature is being sensed.

5. The thermocouple probe according to claim 4, wherein the gas turbine is part of a jet engine.

6. The thermocouple probe according to claim 1 wherein the cooling arrangement is an open loop circuit.

7. The thermocouple probe according to claim 1, wherein the cooling arrangement is a closed loop circuit.

8. The thermocouple probe according to claim 7, wherein the cooling arrangement is the evaporator stage of a phase-change refrigeration system.

9. The thermocouple probe according to claim 1, wherein the cooling tube comprises a cooling jacket around the sheath, and wherein the distal probe sensing end of the thermocouple probe projects beyond the cooling jacket.

10. The thermocouple probe according to claim 9, wherein the cooling jacket includes a pair of concentric tubes defining a return coolant circuit from the proximal probe connection end to a portion of the probe distal from the connectors, and then back to the proximal probe connection end of the probe.

11. The thermocouple probe according to claim 1, wherein the cooling arrangement comprises one or more microbore tubes inside the sheath and around the second pair of thermocouple wires.

12. The thermocouple probe according to claim 1, wherein the sheath is a mineral insulated cable.

13. A method for determining the gas temperature (Tg) in a high temperature environment such as a jet engine, the method comprising:
    providing a thermocouple probe with a first thermocouple junction at a sensing end of the probe to obtain a first temperature measurement (T1) inside the high temperature environment;
    cooling at least a portion of the thermocouple probe inside the jet engine by passing a coolant through a coolant pathway adjacent to a cooled portion of the probe, the sensing end of the probe projecting beyond the coolant pathway and cooled by conduction to the cooled portion of the probe;
    providing the thermocouple probe with a second thermocouple junction adjacent to the sensing end and adjacent to the coolant pathway to obtain a second temperature measurement (T2) in the cooled portion of the probe;
    determining a compensation factor for the first temperature measurement (T1) from the second temperature measurement (T2) to compensate for the effect of the coolant, by determining flow rate and pressure values for a gas stream in the high temperature environment; and
    calculating the gas temperature in the high temperature environment (Tg) by applying the compensation factor to the first temperature measurement (T1).

14. A method according to claim 13, wherein the step of determining the compensation factor includes comparing the first and second temperature measurements (T1, T2) to an empirically determined look-up table generated by testing the probe in different flow rate and pressure conditions.

15. A method according to claim 13 wherein the step of calculating the gas temperature in the high temperature environment (Tg) includes using the function:

Tg=T1+G(p,v)(T1−T2) where G(p,v) is an empirically determined function that is dependent on the pressure (p) and flow rate (v) of a gas stream in which probe is located.

16. A method according to claim 13, wherein the high temperature environment is the turbine stage of a jet engine and the pressure and flow rate values for the gas stream are derived from pressure and turbine rotational speed measurements taken in the jet engine.

17. A system for determining the gas temperature (Tg) in a gas turbine engine, the system comprising i) a thermocouple probe including a first pair of thermocouple wires joined to form a first thermocouple junction at a sensing tip of the thermocouple probe to obtain a first temperature measurement (T1) inside the high temperature environment, a cooling arrangement defining a cooling pathway adjacent to a cooled portion of the probe, the sensing tip projecting beyond the cooling arrangement and cooled during use by conduction to the cooled portion of the probe, and wherein the probe further comprises a second pair of thermocouple wires joined to form a second thermocouple junction in the cooled portion of the probe and adjacent to the sensing tip to obtain a second temperature measurement (T2) in the cooled portion of the probe;

ii) a turbine speed sensor;
iii) a gas pressure sensor; and
iv) a data processor, wherein, in use, the data processor is configured to: determine a compensation factor for the first temperature measurement (T1) from the second temperature measurement (T2) to compensate for the effect of the cooling arrangement, by determining flow rate and pressure values for a gas stream in the gas turbine engine based on pressure and turbine rotational speed measurements obtained by the turbine speed sensor and the gas pressure sensor, and calculate the gas temperature (Tg) by applying the compensation factor to the first temperature measurement (T1).

* * * * *